(12) United States Patent
Ajiro et al.

(10) Patent No.: US 7,864,679 B2
(45) Date of Patent: Jan. 4, 2011

(54) SYSTEM UTILIZATION RATE MANAGING APPARATUS AND SYSTEM UTILIZATION RATE MANAGING METHOD TO BE EMPLOYED FOR IT, AND ITS PROGRAM

(75) Inventors: Yasuhiro Ajiro, Tokyo (JP); Atsuhiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1202 days.

(21) Appl. No.: 11/230,634

(22) Filed: Sep. 21, 2005

(65) Prior Publication Data

US 2006/0062148 A1 Mar. 23, 2006

(30) Foreign Application Priority Data

Sep. 22, 2004 (JP) ............................. 2004-274308

(51) Int. Cl.
*H04L 12/26* (2006.01)

(52) U.S. Cl. ..................................................... 370/232

(58) Field of Classification Search .................. 370/352, 370/480, 259, 353, 354, 338, 234; 709/226, 709/224, 203, 231, 225; 395/200, 200.79; 455/423, 101, 226
See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 5,854,903 | A * | 12/1998 | Morrison et al. | 709/249 |
| 6,078,955 | A * | 6/2000 | Konno et al. | 709/224 |
| 6,438,374 | B1 * | 8/2002 | Bhat | 455/423 |
| 7,046,631 | B1 * | 5/2006 | Giroux et al. | 370/234 |
| 7,248,841 | B2 * | 7/2007 | Agee et al. | 455/101 |
| 2002/0059427 | A1 * | 5/2002 | Tamaki et al. | 709/226 |
| 2003/0009580 | A1 * | 1/2003 | Chen et al. | 709/231 |
| 2003/0014481 | A1 * | 1/2003 | Tsuge et al. | 709/203 |
| 2003/0186663 | A1 * | 10/2003 | Chen et al. | 455/226.3 |
| 2004/0030777 | A1 * | 2/2004 | Reedy et al. | 709/224 |
| 2005/0073997 | A1 * | 4/2005 | Riley et al. | 370/352 |
| 2007/0179791 | A1 * | 8/2007 | Ramesh et al. | 705/1 |

FOREIGN PATENT DOCUMENTS

| | | |
|---|---|---|
| JP | 10-187636 A | 7/1998 |
| JP | 2002-024192 A | 1/2002 |
| JP | 2002-268922 A | 9/2002 |

\* cited by examiner

*Primary Examiner*—Steven H Nguyen
*Assistant Examiner*—Syed Bokhari
(74) *Attorney, Agent, or Firm*—Foley & Lardner LLP (57) ABSTRACT

A system utilization rate managing device that realizes a management of a system performance and an optimization of the number of operating nodes of different performances and architectures is provided.

A node maximum-performance setter of a processing device files a maximum performance of each node constituting an external system into a node maximum-performance memory section of a memory device. A resource utilization rate acquirer acquires a resource utilization rate of each node, and gives it to a virtual utilization rate calculation section. The virtual utilization rate calculation section calculates a virtual utilization rate of the system from the maximum performance of each node retained in a node maximum-performance memory section and the resource utilization rate of each node, and gives the virtual utilization rate to an output section. The output section outputs the virtual utilization rate to an output device.

19 Claims, 9 Drawing Sheets

SYSTEM UTILIZATION RATE MANAGING APPARATUS AND SYSTEM UTILIZATION RATE MANAGING METHOD TO BE EMPLOYED FOR IT, AND ITS PROGRAM

BACKGROUND OF THE INVENTION

The present invention relates to a system utilization rate managing apparatus and a system utilization rate managing method to be employed for it, and its program, and in particular, to a managing method of managing a performance and a utilization rate of a node group for a system that is composed of a plurality of calculating nodes.

Figure 9:
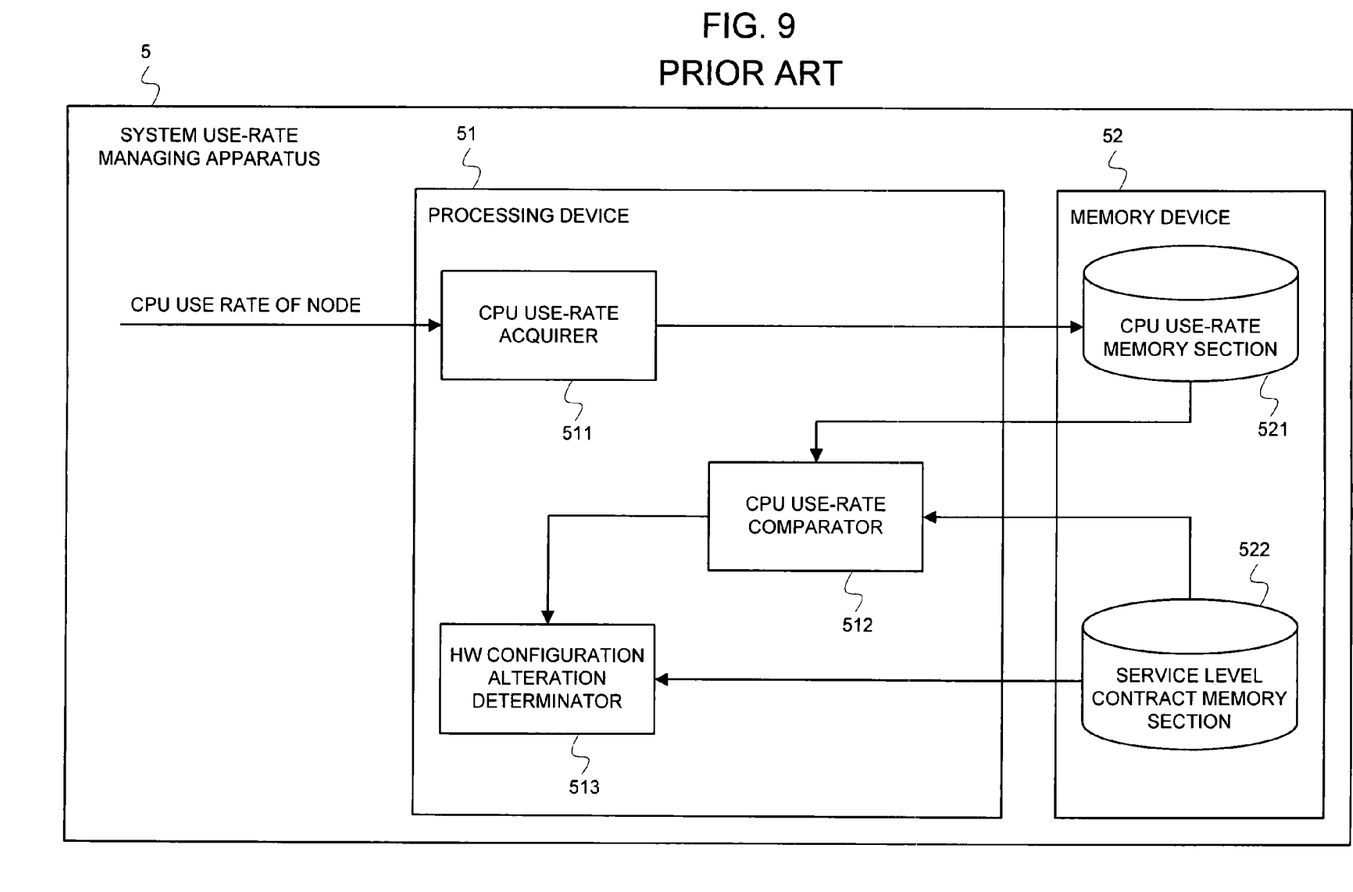
FIG. 9 is a block diagram illustrating a configuration of the system use-rate managing apparatus according to the conventional example.

Conventionally, the system utilization rate managing apparatus includes a processing device 51 and a memory device 52, the processing device 51 includes a CPU (Central Processing Unit) utilization rate acquirer 511, a CPU utilization rate comparator 512, and a HW (Hardware) configuration alteration determinator 513, and the memory device 52 includes a CPU utilization rate memory section 521 and a service level contract memory section 522, respectively, as shown in FIG. 9 (For example, refer to Patent Document 1).

The conventional system utilization rate managing apparatus 5 having the configuration as mentioned above operates as follows. First, the CPU utilization rate acquirer 511 acquires a CPU utilization rate of each node from an external system (not shown) composed of one node or more that is not shown in the figure, and files it into the CPU utilization rate memory section 521. An upper limit of the CPU utilization rate that each node should maintain, a maximum number of the nodes that are reinforceable in cases where the CPU utilization rate of a node has exceeded this upper limit, etc. are prestored in the service level contract memory section 522.

The CPU utilization rate comparator 512 compares the CPU utilization rate of each node, which the CPU utilization rate memory section 521 retains, with the upper limit of the CPU utilization rate that should be maintained, which the service level contract memory section 522 retains, and gives a comparison result to the HW configuration alteration determinator 513. If there is a node of which utilization rate exceeds the upper limit, the HW configuration alteration determinator 513 determines that the service level is not satisfactory, and reinforces the node for the external system. Nodes can be reinforced up to the maximum number of the reinforceable nodes that the service level contract memory section 522 retains.

In contrast if there is a node of which utilization rate is equal to or less than the upper limit of CPU utilization rate, the HW configuration alteration determinator 513 determines that the service level of the external system is satisfactory. If the service level can be maintained with less nodes, the node may be curtailed. The HW configuration alteration determinator 513 estimates the utilization rates after reinforcement or curtailment by regarding the product of the utilization rate and the number of nodes as constant under the assumption that CPU power of all nodes are identical. For example, when four nodes are all operated at the CPU utilization rate of 25%, the utilization rate of each node at the time of having increased the number of the node to five is estimated to be 20%. Conversely, the utilization rate of each node at the time of having curtailed the number of the node to two is estimated to be 50%.

[Patent Document 1] JP-P2002-24192A

With the foregoing system utilization rate managing apparatus, there is the problem that it cannot be properly estimated whether nodes should be reinforced in cases where current nodes have different performances. The reason is that the foregoing apparatus cannot estimate the total performance or the total capacity of nodes of various performances. For example, if the utilization rate of a node of low performance is higher than an upper limit, and the utilization rate of another node of high performance is quite low, then the system including the two nodes has large capacity. Nevertheless, the foregoing apparatus will reinforce nodes to the system in spite of the large capacity.

Further, in many cases, CPU clock, which are simple metrics of performance, does not accurately signify the performance of an application software operating over the system. This is because the performance of an application does not always depends on CPU clocks but on the architecture of CPU and the entire computer system.

SUMMARY OF THE INVENTION

Thereupon, an objective of the present invention is to provide a system utilization rate managing apparatus, which solves the above-mentioned problems and optimizes the number of operating nodes of various performances and architectures, and a system utilization rate managing method to be employed for it, and its program.

The system utilization rate managing apparatus of the present invention, which is a system utilization rate managing apparatus configured to calculate a system utilization rate of a node group composed of a plurality of computing nodes, includes a node maximum-performance setter configured to set the maximum performance of each of the plurality of the computing nodes, a resource utilization rate acquirer configured to acquire the resource utilization rate of each of the plurality of the computing nodes, and a virtual utilization rate calculator configured to calculate the virtual utilization rate of an entirety of the node group from the maximum performance set in the node maximum-performance setter and the resource utilization rate acquired in the resource utilization rate acquirer.

The system utilization rate managing method of the present invention, which is a system utilization rate managing method to be employed in a system utilization rate managing apparatus configured to calculate a system utilization rate of a node group composed of a plurality of computing nodes, includes the steps of, on the side of the system utilization rate managing apparatus: setting the maximum performance of each of the plurality of the computing nodes; acquiring the resource utilization rate of each of the plurality of the computing nodes; and calculating the virtual utilization rate of an entirety of the node group from the maximum performances and the resource utilization rates.

The program of the system utilization rate managing method of the present invention, which is a program of a system utilization rate managing method to be employed in a system utilization rate managing apparatus configured to calculate the system utilization rate of a node group composed of a plurality of computing nodes, causes a computer of the system utilization rate managing apparatus to execute the processes of: setting the maximum performance of each of the plurality of the computing nodes; acquiring the resource utilization rate of each of the plurality of the computing nodes; and calculating the virtual utilization rate of an entirety of the node group from the maximum performances and the resource utilization rates.

That is, the system utilization rate managing apparatus of the present invention realizes a management of the system performance and the optimization of the number of operating nodes of various performances and architectures by calculating the performance and the utilization rate of a node group.

Explaining more specifically, the system utilization rate managing apparatus of the present invention includes the node maximum-performance setter configured to set the maximum performance of each of the plurality of the computing nodes, the resource utilization rate acquirer configured to acquire the resource utilization rate of each of a plurality of the computing nodes, the virtual utilization rate calculator configured to calculate the virtual performance and utilization rate of an entirety of a node group from the maximum performance and the resource utilization rate of each node, and an outputter configured to output the calculated entire performance and utilization rate, and outputting the performance and the utilization rate of the node group accomplishes the above-mentioned objective.

Thereby, in the system utilization rate managing apparatus of the present invention, it becomes possible to quickly grasp the utilization and loading situation of a system by calculating the performance and the utilization rate of a node group, even if the group is composed of a plurality of computing nodes each having the different performance and architecture.

Further, in the system utilization rate managing apparatus of the present invention, it becomes possible to quickly determine whether an entire system operates within the allowable range of utilization rates by calculating the allowable utilization rate of the node group from the allowable utilization rate of each node.

Moreover, in the system utilization rate managing apparatus of the present invention, it becomes possible to prepare an operational report having the virtual utilization rate arranged along a time series by printing the time of having calculated the virtual utilization rate together with the virtual utilization rate itself.

BRIEF DESCRIPTION OF THE DRAWING

This and other objects, features and advantages of the present invention will become more apparent upon a reading of the following detailed description and a drawing, in which.

DESCRIPTION OF THE EMBODIMENTS

Figure 1:
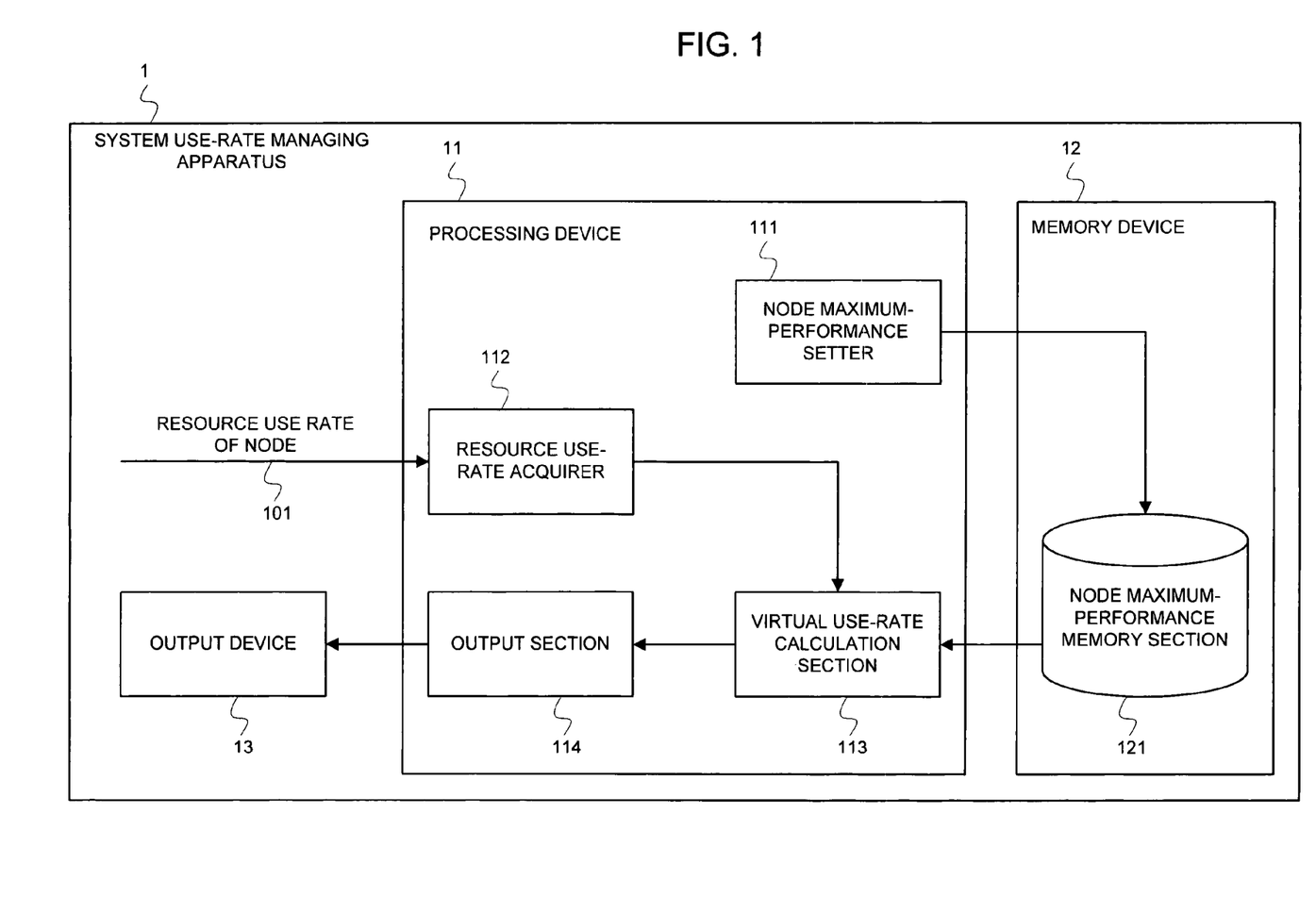
FIG. 1 is a block diagram illustrating a configuration of the system use-rate managing apparatus according to an embodiment of the present invention.

Next, an embodiment of the present invention will be explained by making a reference to the accompanied drawings. FIG. 1 is a block diagram illustrating a configuration of the system utilization rate managing apparatus according to the embodiment of the present invention. In FIG. 1, a system utilization rate managing apparatus 1 is composed of a processing device 11, a memory device 12, and an output device 13. The processing device 11 includes a node maximum-performance setter 111, a resource utilization rate acquirer 112, a virtual utilization rate calculation section 113, and an output section 114, and the memory device 12, which includes a node maximum-performance memory section 121, files a program (computer-executable program) that is executed in the processing device 11.

The node maximum-performance setter 111 files the maximum performance of each node (not shown) constituting an external system into the node maximum-performance memory section 121. The resource utilization rate acquirer 112 acquires a resource utilization rate 101 of each node, and gives it to the virtual utilization rate calculation section 113. The virtual utilization rate calculation section 113 calculates a virtual utilization rate of the system from the maximum performance of each node retained in the node maximum-performance memory section 121 and the given resource utilization rate of each node, and gives the virtual utilization rate to the output section 114. The output section 114 outputs the given virtual utilization rate to the output device 13.

Figure 2:
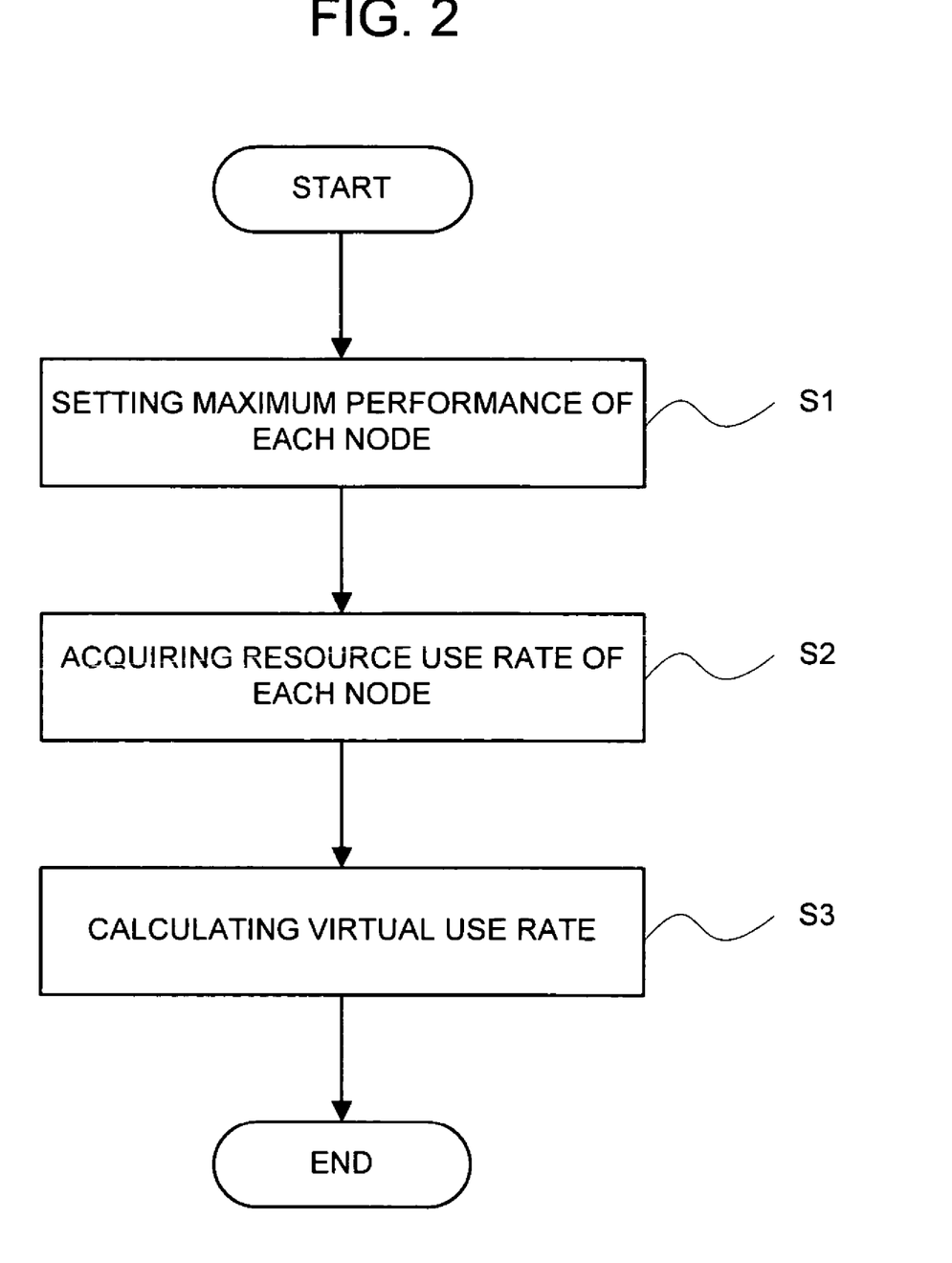
FIG. 2 is a flowchart illustrating an operation of the system use-rate managing apparatus according to the embodiment of the present invention.

FIG. 2 is a flowchart illustrating an operation of the system utilization rate managing apparatus 1 according to the embodiment of the present invention. The operation of the system utilization rate managing apparatus 1 according to the embodiment of the present invention will be explained by making a reference to these FIG. 1 and FIG. 2. Additionally, the processing device 11 executes the program of the memory device 12, thereby allowing the processes shown in FIG. 2 to be realized.

First, the node maximum-performance setter 111 files the maximum performance of each node constituting the external system into the node maximum-performance memory section 121 (step S1 of FIG. 2). Herein, the so-called maximum performance signifies the number of requests, etc. that can be processed per unit time. Hereinafter, those which triggers off some process on the reception side, for example, a packet to be transmitted/received via a network, a machine language, a statement in a program text, and a function are generically called a request in addition to the request to a Web server and a database server.

A value input by a user via an input device etc. not shown in the figure, a pre-prepared value, an originally calculated value, etc. are employed for the maximum performance of each node. Further, for the reason to be later described, the maximum performance of each node is not always an absolute value, but may be a ratio of the maximum performance between the nodes.

In the external system, the nodes carrying out the same kind of the works or the related works may be grouped, thereby to carry out the setting of the node maximum-performance and the calculation of the virtual utilization rate for the node group within the identical group. Hereinafter, unless an annotation is given otherwise, the entirety of the node group within the identical group and the entirety of the system are explained without drawing a distinction between them.

The resource utilization rate acquirer 112 acquires the resource utilization rate 101 of each node, and gives it to the virtual utilization rate calculation section 113 (step S2 of FIG.

2). A CPU utilization rate, a disk utilization rate, etc. are listed as the resource utilization rate. The so-called utilization rate signifies a rate of the time that the resources such as the CPU (Central Processing Unit) and the disk are actually used per unit time.

The virtual utilization rate calculation section 113 calculates a virtual utilization rate of the node group from the maximum performance of each node retained in the node maximum-performance memory section 121 and the given resource utilization rate of each node, and gives the virtual utilization rate to the output section 114 (step S3 of FIG. 2).

When the maximum performance of the node having an identification number i is assumed to be $\alpha i \cdot \mu$, the maximum performance of the node group can be signified by a sum of the maximum performance of each node $\Sigma i\,(\alpha i \cdot \mu)$, where $\alpha i \cdot \mu$ signifies an absolute performance, and $\alpha i$ signifies a relative performance (performance ratio) to other node. For example, when the absolute performances $\alpha 1 \cdot \mu$, $\alpha 2 \cdot \mu$, and $\alpha 3 \cdot \mu$ of three nodes are 120 requests/sec, 80 requests/sec, and 200 requests/sec respectively, it follows that $\alpha 1 = 3$, $\alpha 2 = 2$, and $\alpha 3 = 5$.

On the other hand, when a request arrival rate to a node i is assumed to be $\lambda i$, a resource utilization rate $\rho i$ of each node can be signified by $$\rho i = \lambda i / (\alpha i \cdot \mu)$$

Herein, suppose that the entirety of the node group is one virtual node, the request arrival rate to the node group becomes $$\Sigma i(\lambda i)$$

whereby a utilization rate (virtual utilization rate) $\rho$ of the node group can be expressed by $$\rho = \Sigma i(\lambda i) / \Sigma i(\alpha i \cdot \mu)$$

Moreover, by using $$\lambda i = \rho i \cdot \alpha i \cdot \mu$$

thereby to modify the above-mentioned equation, $$\rho = \sum i(\rho i \cdot \alpha i \cdot \mu) / \sum i(\alpha i \cdot \mu)$$
$$= \sum i(\rho i \cdot \alpha i) / \sum i(\alpha i)$$

is obtained. That is, employing the absolute performance value or the performance ratio between the nodes together with the utilization rate of each node allows the virtual utilization rate to be calculated with the above-mentioned equation.

Further, in a case where the allowable utilization rates, which are the upper limit of utilization rates, are provided so as to keep response time below a certain value, giving the allowable utilization rate of each node to the resource utilization rate acquirer 112 also enables the allowable utilization rate of the node group to be obtained.

Last, the output section 114 outputs the virtual utilization rate of the node group to the output device 13. The output section 114 may output the time of the calculation, configuration information of the node, etc. together with the virtual utilization rate. The embodiment of the present invention is also allowed either to operate on a node of the external system or to operate on a computer or a computing node that is outside the external system.

In the embodiment of the present invention, it is possible to quickly grasp the utilization and the loading situation of the system because the performance and the utilization rate of the node group can be calculated for the computer system that is composed of a plurality of nodes each having the different performance and architecture.

Further, in the embodiment of the present invention, it is possible to quickly determine whether the operation of the system has been made as a whole at the utilization rate that is within the allowable range because the allowable utilization rate of the node group can be calculated from the allowable utilization rate of each node.

Moreover, in the embodiment of the present invention, it is possible to prepare an operational report having the virtual utilization rate arranged along a time series because the time of calculating the virtual utilization rate can be output together with the virtual utilization rate.

The specific example of this embodiment of the present invention will be explained. The following explanation is made on the premise that the external system is composed of three operating nodes for Web servers, two operating nodes for application servers, and two operating nodes for database servers, which are not shown in the figure.

In a case of calculating the virtual utilization rate for the three nodes of Web servers, a user of the present invention gives an identical group identifier to the three nodes, thereby enabling the node to be grouped. Further, the nodes may be grouped by means of the operation of using a GUI (Graphical User Interface), thereby to arrange each node displayed on a screen within a region representing the group, or the like.

For three nodes of Web servers grouped in such a manner, first, the maximum performance of each node is input from the node maximum-performance setter 111, in turn, filed into the node maximum-performance memory section 121. Suppose the maximum performances of "$\alpha 1 \cdot \mu = 120$", "$\alpha 2 \cdot \mu = 80$", and "$\alpha 3 \cdot \mu = 200$" are given based on the number of HTTP (Hyper Text Transfer Protocol) requests that can be processed per second by the three nodes, respectively.

The node maximum-performance memory section 121 may retain the maximum performance of each node in a format of the performance ratio. In this case, the performance ratio becomes "$\alpha 1 = 3$", "$\alpha 2 = 2$", and "$\alpha 3 = 5$".

The resource utilization rate acquirer 112 acquires the resource utilization rate 101 of each node, and gives it the virtual utilization rate calculation section 113. Herein, as an example, the CPU utilization rate that an OS (Operating System) etc. of the external system offers is considered as a resource utilization rate. Now, it is assumed that the CPU utilization rate acquired from each node is "$\rho 1 = 0.2$", "$\rho 2 = 0.15$", and "$\rho 3 = 0.6$" respectively.

The virtual utilization rate calculation section 113 calculates the virtual utilization rate for the three nodes of Web servers from the maximum performance of each node retained in the node maximum-performance memory section 121 and the CPU utilization rate of each node given by the resource utilization rate acquirer 112, and gives the virtual utilization rate to the output section 114. A virtual utilization rate $\rho$ is calculated as $$\rho = \sum i(\rho i \cdot \alpha i \cdot \mu) / \sum i(\alpha i \cdot \mu)$$
$$= (0.2 \cdot 120 + 0.15 \cdot 80 + 0.6 \cdot 200) / (120 + 80 + 200)$$
$$= 0.39$$

Also in a case of employing the maximum performance ratio, the virtual utilization rate $\rho$ becomes $$\rho = \sum i(\rho i \cdot \alpha i) / \sum i(\alpha i)$$
$$= (0.2 \cdot 3 + 0.15 \cdot 2 + 0.6 \cdot 5)/(3 + 2 + 5)$$
$$= 0.39$$

and the identical result to the foregoing is obtained.

Last, the output section 114 outputs the virtual utilization rate of the system to the output device 13 such as a display and a printer. For example, the virtual utilization rate of the group can be displayed at a location of the screen corresponding to the node group. Further, in the embodiment of the present invention, the acquisition of the CPU utilization rate of each node, the calculation and output of the virtual utilization rate, the record thereof are carried out continuously, thereby making it possible to display a change in the virtual utilization rate according to a time elapse in a format such as a graph.

Moreover, in the embodiment of the present invention, arranging the time that the CPU utilization rate of each node was acquired and the virtual utilization rate to be calculated from it in a list or a graph makes it possible to prepare a report useful to an administrator or a user of the external system. The configuration information such as the types of CPUs, memory capacity, OS and middleware may be output/displayed together with the time or the virtual utilization rate on the GUI or the report.

Yet moreover, in the embodiment of the present invention, the application servers or the database servers also are grouped to calculate the virtual utilization rate thereof similarly to the foregoing, thereby making it possible to prepare a report having a transition of the virtual utilization rate of each group arranged and to establish an operational plan such as accommodation of the nodes among the groups and reinforcement of the node based upon this.

Embodiment 1

Figure 3:
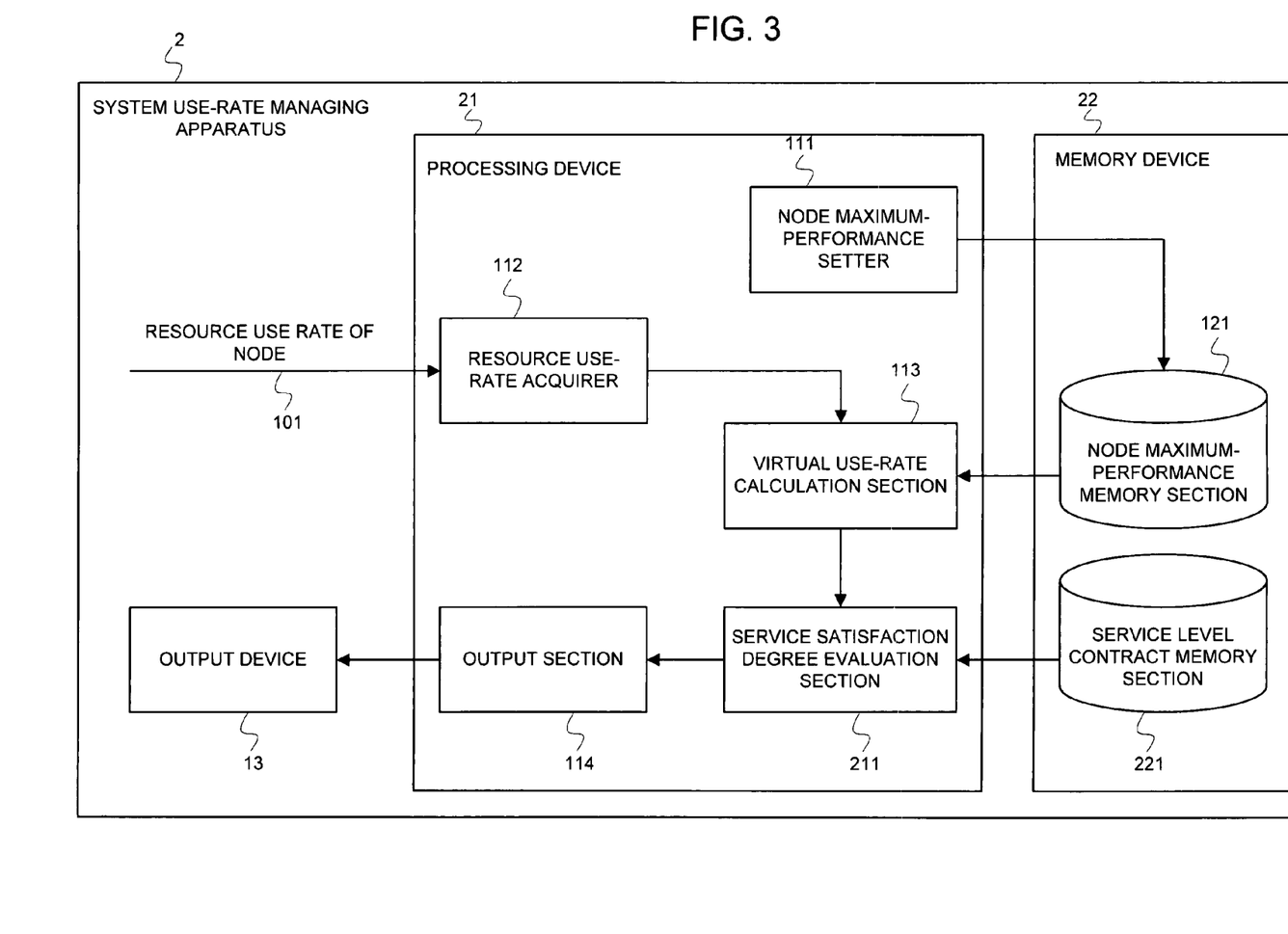
FIG. 3 is a block diagram illustrating a configuration of the system use-rate managing apparatus according to a first embodiment of the present invention.

FIG. 3 is a block diagram illustrating a configuration of the system utilization rate managing apparatus according to the first embodiment of the present invention. In FIG. 3, a system utilization rate managing apparatus 2 according the first embodiment of the present invention has a similar configuration to that of the system utilization rate managing apparatus 1 according to the embodiment of the present invention shown in FIG. 1 except that it is configured to include a service satisfaction degree evaluation section 211 in a processing device 21, and a service level contract memory section 221 in a memory device 22, and identical codes are affixed to the identical components. Further, the operation of the identical component is similar to that of the embodiment of the present invention.

The service satisfaction degree evaluation section 211 evaluates the virtual utilization rate, which the virtual utilization rate calculation section 113 calculated, based upon a service level contract that the service level contract memory section 221 retains, and gives an evaluation result to the output section 114. Additionally, the memory device 22 files the program (computer-executable program) that is executed in the processing device 21.

Figure 4:
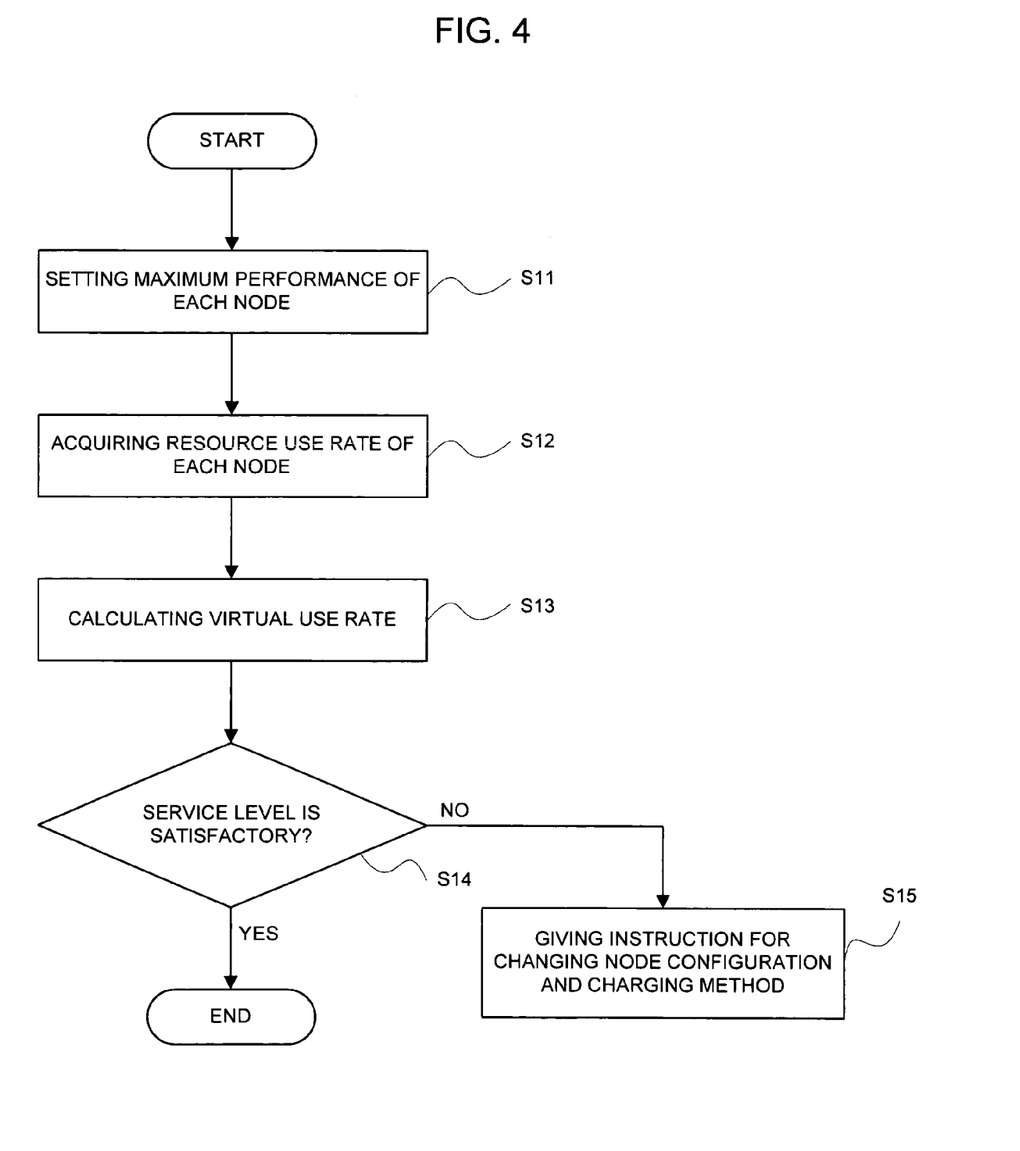
FIG. 4 is a flowchart illustrating an operation of the system use-rate managing apparatus according to the first embodiment of the present invention.

FIG. 4 is a flowchart illustrating an operation of the system utilization rate managing apparatus 2 according to the first embodiment of the present invention. The operation of the system utilization rate managing apparatus 2 according to the first embodiment of the present invention will be explained by making a reference to these FIG. 3 and FIG. 4. Additionally, the processing device 21 executes the program of the memory device 22, thereby allowing the processes shown in FIG. 4 to be realized. Further, the process operation of steps S11 to S13 (each of the operations of the node maximum-performance setter 111, the resource utilization rate acquirer 112, and the virtual utilization rate calculation section 113) shown in FIG. 4 is identical to the operation (the process operation of steps S1 to S3 of FIG. 2) of the part that corresponds to the foregoing embodiment of the present invention, so the explanation is omitted.

In the embodiment of the present invention, the virtual utilization rate that the virtual utilization rate calculation section 113 calculated is given to the output section 114; however in this embodiment, the virtual utilization rate that the virtual utilization rate calculation section 113 calculated is given to the service satisfaction degree evaluation section 211.

The service satisfaction degree evaluation section 211 evaluates the virtual utilization rate, which the virtual utilization rate calculation section 113 calculated, based upon the service level contract that the service level contract memory section 221 retains. The service level contract memory section 221 retains an allowable utilization rate of the node group. Further, the service level contract memory section 221 may retain a charging method based upon the virtual utilization rate of the system, a coping method that should be performed in a case where the virtual utilization rate of the system has exceeded the allowable utilization rate. Coping methods include an addition of the node, an alteration of a charging method. Moreover, in a case where the virtual utilization rate is largely lower than the allowable utilization rate, the node may be curtailed.

The service satisfaction degree evaluation section 211 determines whether the virtual utilization rate of the system is equal to or less than the allowable utilization rate (step S14 of FIG. 4), and if the determination result is that it is so, the service satisfaction degree valuation section 211 gives the output section 114 the result that the service level is satisfactory. In a case where the determination result is that it is not so, the service satisfaction degree evaluation section 211 gives the output section 114 the coping method such as the alteration of the node configuration and the charging method that the service level contract memory section 221 retains (step S15 of FIG. 4). Last, the output section 114 outputs the evaluation result to the output device 13.

In this embodiment, user's work of maintaining or managing the service can be simplified because the optimization of the number of nodes and the modification to the charging method can be instructed based upon the service level contract.

The specific example of this first embodiment of the present invention will be explained. The following explanation is made on the premise that the external system is composed of three operating nodes for Web servers, two operating nodes for application servers, and two operating nodes for database servers, which are not shown in the figure.

In the first embodiment of the present invention, the virtual utilization rate is given to the service satisfaction degree evaluation section 211 instead of the output section 114. The service satisfaction degree evaluation section 211 determines whether the virtual utilization rate is equal to or less than the allowable utilization rate according to the specified content of the service level contract memory section 221. In the service level contract memory section 221, in addition to the allowable utilization rate, the coping method for a case where the virtual utilization rate has exceeded the allowable utilization rate are specified for each service, each node, each node group, etc. Here, suppose that the node group for Web servers should operate at the virtual utilization rate of 35% or less, a coping method is addition of nodes, and that the kind of nodes that should be added are specified.

If the virtual utilization rate of the node group for Web servers is 39%, which exceeds the allowable rate, a predetermined number of nodes are added. Further, in a case where the maximum performance of nodes to be added is known, for example, in a case where the kind of nodes to be added is identical to that of the nodes already operated, the virtual utilization rate after addition can be estimated.

For example, suppose that one node having a maximum performance of 80 is added. Then, the numerator in the equation of the virtual utilization rate $$\rho = \Sigma i(\rho i \cdot \alpha i \cdot \mu)/\Sigma i(\alpha i \cdot \mu)$$

is not altered also after addition because it signifies the total number $\Sigma i(\lambda i)$ of the requests. So, the virtual utilization rate after addition is $$\rho = \sum i(\rho i \cdot \alpha i \cdot \mu) / \sum i(\alpha i \cdot \mu)$$
$$= (0.2 \cdot 120 + 0.15 \cdot 80 + 0.6 \cdot 200)/(120 + 80 + 200 + 80)$$
$$= 0.325$$

which is less than the allowable utilization rate.

Further, assuming that the maximum performance of the node to be added is X, and solving an inequality $$(0.2 \cdot 120 + 0.15 \cdot 80 + 0.6 \cdot 200)/(120 + 80 + 200 + X) \leq 0.35$$

$45.8 \leq X$ is obtained, whereby it turns out that the addition of one node having a maximum performance of 45.8 or more is enough. Alternatively, a plurality of the nodes may be added so that the total maximum performance thereof becomes 45.8 or more.

The service satisfaction degree evaluation section 211 gives the output section 114 the expected value of utilization rate after addition obtained by the method above and the maximum performance of the node that should be added, or the like in addition to an instruction for adding the node. Last, the output section 114 outputs these pieces of information to the output device 13 such as a display. If the external system is equipped with a mechanism of automatically reinforcing nodes, it is also possible to directly give the external system an instruction for adding nodes.

Embodiment 2

Figure 5:
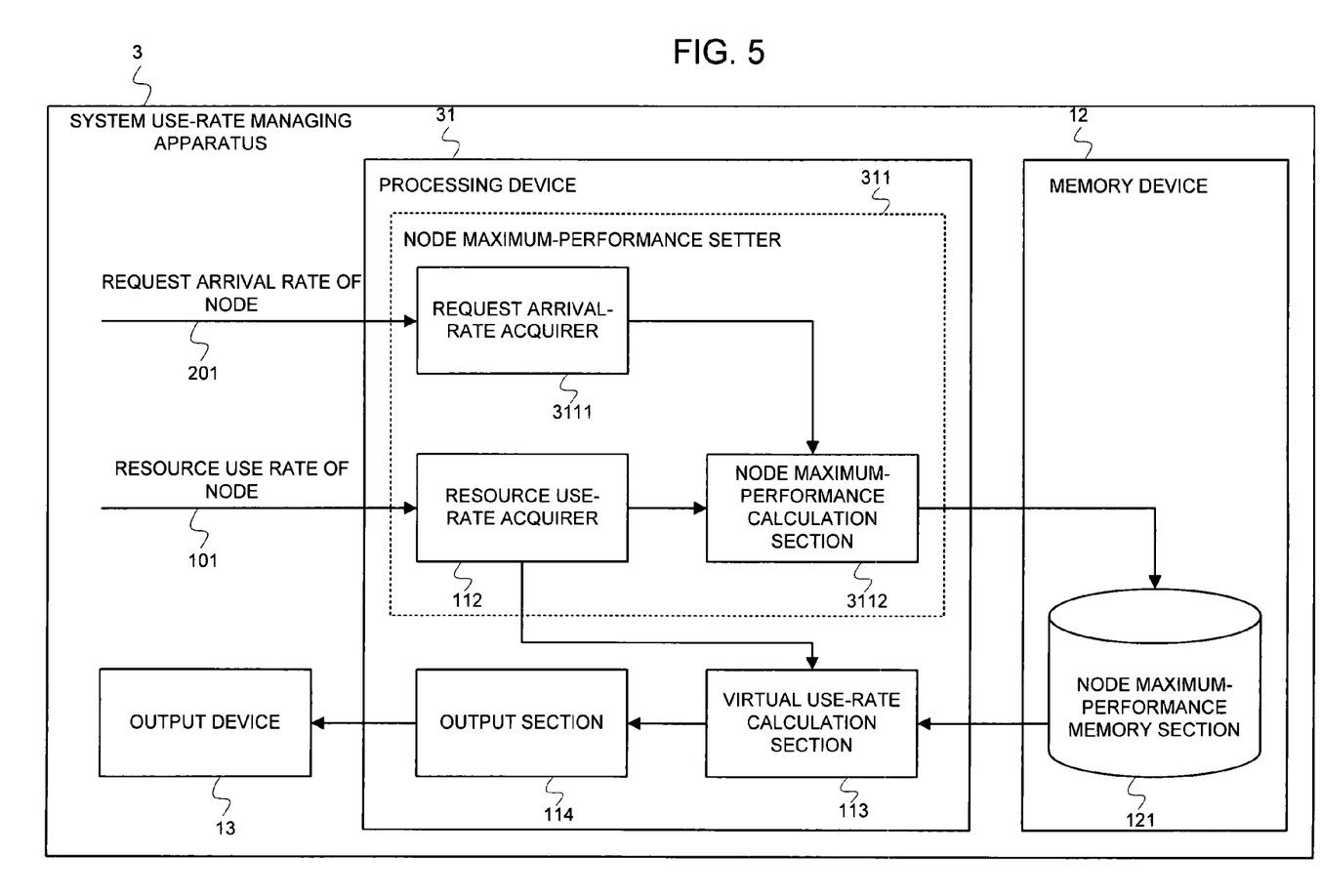
FIG. 5 is a block diagram illustrating a configuration of the system use-rate managing apparatus according to a second embodiment of the present invention.

FIG. 5 is a block diagram illustrating a configuration of the system utilization rate managing apparatus according to a second embodiment of the present invention. In FIG. 5, a system utilization rate managing apparatus 3 according to the second embodiment of the present invention has a similar configuration to that of the system utilization rate managing apparatus 1 according to the embodiment of the present invention shown in FIG. 1 except that it is configured to include a node maximum performance setter 311, which is composed of a request arrival-rate acquirer 3111, a node maximum-performance calculation section 3112, and the resource utilization rate acquirer 112, in a processing device 31, and identical codes are affixed to the identical components. Further, the operation of the identical component is similar to that of the embodiment of the present invention. The request arrival-rate acquirer 3111 acquires a request arrival rate 201 of each node, and gives it to the node maximum-performance calculation section 3112. The node maximum-performance calculation section 3112 calculates the maximum performance of each node from the request arrival rate of each node given by the request arrival-rate acquirer 3111 and the resource utilization rate of each node given by the resource utilization rate acquirer 112, and files the maximum performance into the node maximum-performance memory section 121.

Figure 6:
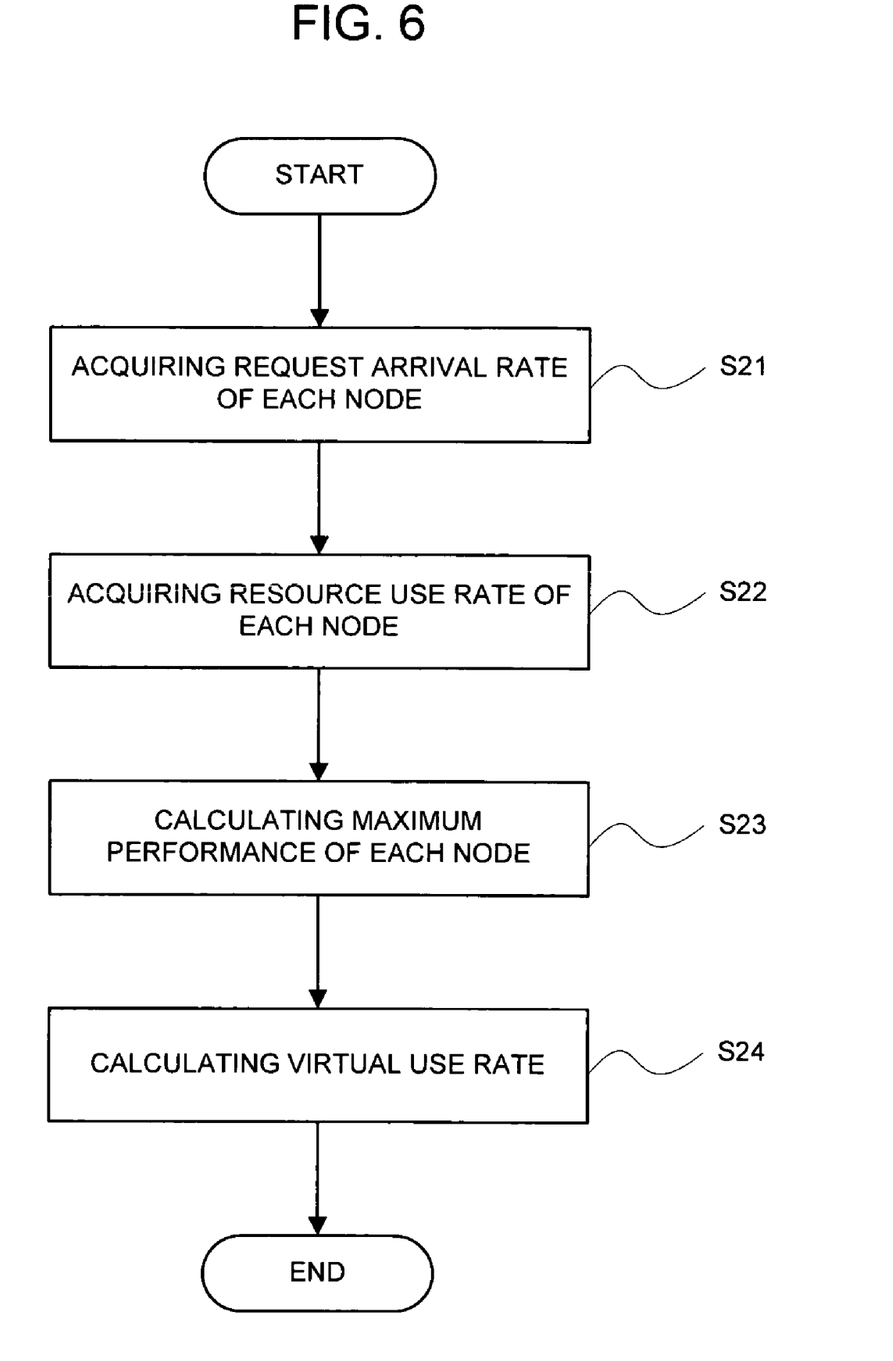
FIG. 6 is a flowchart illustrating an operation of the system use-rate managing apparatus according to the second embodiment of the present invention.

FIG. 6 is a flowchart illustrating an operation of the system utilization rate managing apparatus 3 according to the second embodiment of the present invention. The operation of the system utilization rate managing apparatus 3 according to the second embodiment of the present invention will be explained by making a reference to these FIG. 5 and FIG. 6. Additionally, the processing device 31 executes the program of the memory device 12, thereby allowing the processes shown in FIG. 6 to be realized.

First, the request arrival-rate acquirer 3111 acquires the request arrival rate 201 of each node, and gives the request arrival rate 201 to the node maximum-performance calculation section 3112 (step S21 of FIG. 6).

The resource utilization rate acquirer 112 acquires the resource utilization rate 101 of each node, and gives the resource utilization rate 101 to the virtual utilization rate calculation section 113 and the node maximum-performance calculation section 3112 (step S22 of FIG. 6).

Additionally, the execution sequence of the above-mentioned steps S21 and S22 may be an arbitrary one. Further, the request arrival rate and resource utilization rate of each node to be given to the node maximum-performance calculation section 3112 may be an averaged value calculated from sampling data collected during a certain period.

The node maximum-performance calculation section 3112 calculates the maximum performance of each node from the given request arrival rate and resource utilization rate of each node, and files the maximum performance into the node maximum-performance memory section 121 (step S23 of FIG. 6).

A maximum performance, which is the number of requests that can be processed at the utilization rate of 1.0 (100%), $\alpha i \cdot \mu$ of a node i is calculated by $$\alpha i \cdot \mu = \lambda i / \rho i$$

where the request arrival rate of the node i is $\lambda i$, and the resource utilization rate is $\rho i$. An averaged request arrival rate and an averaged resource utilization rate can be substituted for $\lambda i$ and $\rho i$, respectively.

The virtual utilization rate calculation section 113 calculates the virtual utilization rate from the maximum performance of each node retained in the node maximum-performance memory section 121 and the resource utilization rate of each node, and gives the virtual utilization rate to the output section 114 (step S24 of FIG. 6), similarly to the operation of the virtual utilization rate calculation section 113 in the foregoing embodiment of the present invention.

Last, the output section 114 outputs the virtual utilization rate to the output device 13. Further, the output section 114 may output the maximum performance $\alpha i \cdot \mu$ of each node and the maximum performance $\Sigma i(\alpha i \cdot \mu)$ of the node group together therewith.

The performance of the application is not simply proportional to the CPU performance, but strongly depends upon the architectures of computers and CPUs, the characteristics of applications, and the ways of deploying applications. In this embodiment, it is possible to grasp the more accurate utilization and loading situation of the system at low cost because the system performance and the virtual utilization rate can be calculated based upon the maximum performance calculated from data collected from the system in service.

The specific example of this second embodiment of the present invention will be explained. First, the request arrival-rate acquirer 3111 collects the request arrival rate 201 of each node of the external system during a certain period, and calculates the average value of the request arrival rates based upon the collected data. The average request arrival rate calculated is given to the node maximum-performance calculation section 3112.

Similarly hereto, the resource utilization rate acquirer 112 collects the resource utilization rate 101 of each node of the external system during a certain period, calculates an average request arrival rate based upon collected data, and gives the average request arrival rate to the node maximum-performance calculation section 3112.

The node maximum-performance calculation section 3112 calculates the maximum performance of each node from the average request arrival rate and the average resource utilization rate that were given, and files the maximum performance into the node maximum-performance memory section 121.

Herein, suppose that the external node group includes three nodes, the average request arrival rate of each node is "λ1=70", "λ2=45", and "λ3=320" respectively, and the averaged resource utilization rate is "ρ1=0.2", "ρ2=0.15", and "ρ3=0.4", respectively. So, the maximum performance $\alpha i \cdot \mu$ of each node becomes "α1·μ=350", "α2·μ=300", and "α3·μ=800", respectively, from the equation of $$\alpha i \cdot \mu = \lambda i / \rho i$$

When the virtual utilization rate calculation section 113 is given the resource utilization rate of each node by the resource utilization rate acquirer 112, the virtual utilization rate calculation section 113 makes a reference to the maximum performance value of each node and calculates the virtual utilization rate of the node group, similarly to the above-mentioned embodiment of the present invention. Further, the virtual utilization rate calculation section 113 can also retroactively calculate the virtual utilization rate for the resource utilization rate data of each node acquired at the time of calculating the maximum performance of each node, and the averaged value.

Embodiment 3

Figure 7:
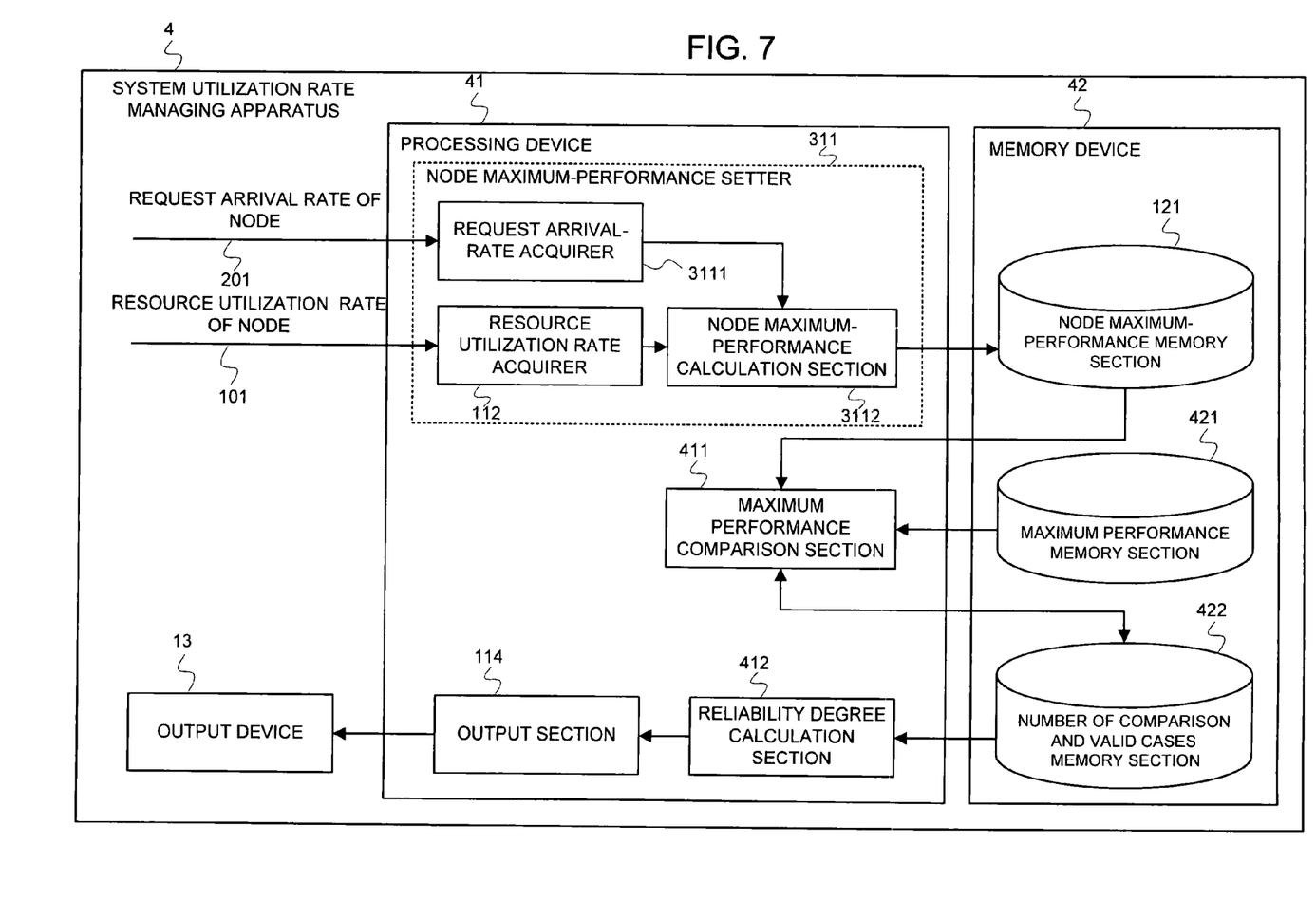
FIG. 7 is a block diagram illustrating a configuration of the system use-rate managing apparatus according to a third embodiment of the present invention.

FIG. 7 is a block diagram illustrating a configuration of the system utilization rate managing apparatus according to a third embodiment of the present invention. In FIG. 7, a system utilization rate managing apparatus 4 according to the third embodiment of the present invention has a similar configuration to that of the system utilization rate managing apparatus 3 according to the second embodiment of the present invention shown in FIG. 5 except that it is configured to include a maximum performance comparison section 411 and a reliability degree calculation section 412 instead of the virtual utilization rate calculation section 113 in a processing device 41, and yet to include a maximum performance memory section 421, and the number of comparisons and valid cases memory section 422 in a memory device 42, and identical codes are affixed to the identical components. Further, the operation of the identical component is similar to that of the second embodiment of the present invention.

The maximum performance comparison section 411 compares the node maximum-performance value retained in the maximum performance memory section 421, which is currently employed for calculating the virtual utilization rate, with the latest node maximum-performance value retained in the node maximum-performance memory section 121, which has been newly calculated, inspects whether the node maximum-performance value that is currently employed is valid, judging from the latest node maximum-performance value, and files the number of times of comparison and the number of valid cases into the number of comparisons and valid cases memory-section 422.

The reliability degree calculation section 412 calculates a reliability degree of the node maximum performance, which is currently employed, from the number of times of comparison and the number of valid cases retained in the number of comparisons and valid cases memory section 422 and gives the reliability degree of the node maximum performance, which is currently employed, to the output section 114. Additionally, the memory device 42 files the program (computer-executable program) that is executed in the processing device 41.

Figure 8:
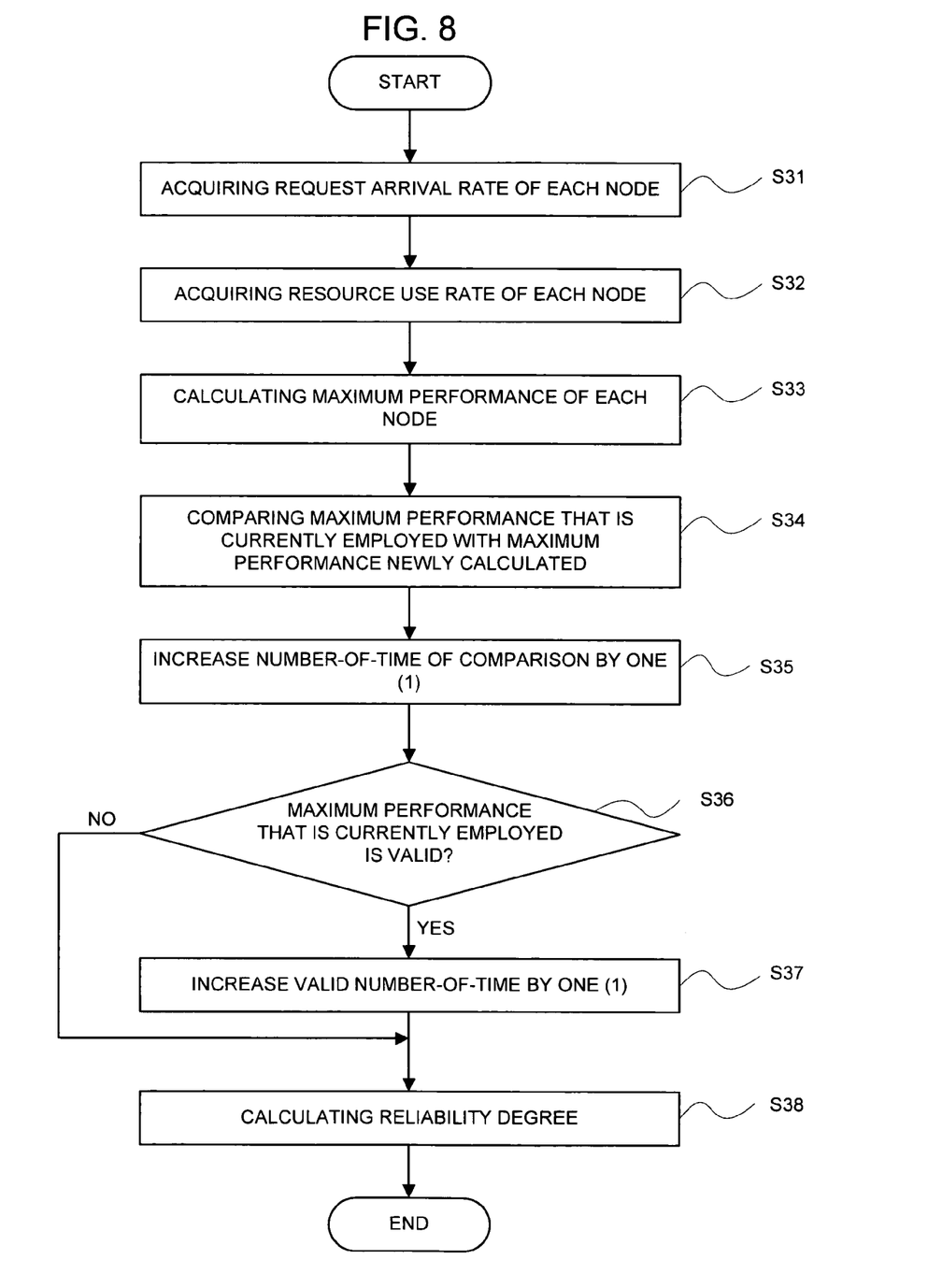
FIG. 8 is a flowchart illustrating an operation of the system use-rate managing apparatus according to the third embodiment of the present invention.

FIG. 8 is a flowchart illustrating an operation of the system utilization rate managing apparatus 4 according to the third embodiment of the present invention. The operation of the system utilization rate managing apparatus 4 according to the third embodiment of the present invention will be explained by making a reference to these FIG. 7 and FIG. 8. Additionally, the processing device 41 executes the program of the memory device 42, thereby allowing the processes shown in FIG. 8 to be realized. Further, the process operation of steps S31 to S33 (each of the operations of the request arrival-rate acquirer 3111, the resource utilization rate acquirer 112, and the node maximum-performance calculation section 3112) of FIG. 8 is identical to the operation (the process operation of the steps S21 to S23 of FIG. 6) of the part corresponding to the second embodiment of the present invention shown in FIG. 6, so the explanation is omitted. In this embodiment, the node maximum performance value that is currently employed for calculating the virtual utilization rate, etc. is retained in the maximum performance memory section 421. The node maximum-performance value to be retained is a value calculated in the past, a value given from the outside, etc. The maximum performance comparison section 411 compares the node maximum-performance, which is currently employed, with the latest node maximum-performance retained in the node maximum-performance memory section 121, which has been newly calculated this time (step S34 of FIG. 8).

Specifically explaining, the maximum performance comparison section 411 compares the value of the performance (virtual maximum-performance) of the node group to be calculated as a total value of the node maximum-performance values, which are currently employed, with the value of the virtual maximum performance to be calculated from the latest node maximum-performance, and inspects whether a difference between both performance values is within the allowable range. As a simple inspection method, there exists the method etc. of determining that the virtual maximum-performance that is currently employed is valid even now if, where the virtual maximum-performance, which is currently employed, is Up, the latest virtual maximum-performance is Un, and the allowable error is e, the value of Un is within a range of $$Up \cdot (1-e) \leq Un \leq Up \cdot (1+e).$$

Further, the value calculated outside the apparatus according to this embodiment may be given to the maximum performance comparison section 411 as a latest node maximum-performance.

The maximum performance comparison section 411 increase the number of times of comparison retained in the number of comparisons and valid cases memory section 422 by one (1) (step S35 of FIG. 8). Additionally, the processes of the above-mentioned step S34 and step S35 may be sequenced arbitrarily.

In a case where the maximum performance comparison section 411 has determined that the virtual maximum performance value, which is currently employed, is valid as a result of having compared the above-mentioned two virtual maximum-performance values, it increases the number of valid cases retained in the number of comparisons and valid cases memory section 422 by one (1) (steps S36 and S37 of FIG. 8). In a case where the maximum performance comparison section 411 has determined that a difference between the virtual maximum performance, which is currently employed, and the latest virtual maximum-performance has exceeded the allowable range, and the virtual maximum performance, which is currently employed is invalid, it proceeds to the next process without taking any action.

The reliability degree calculation section 412 calculates the reliability degree of the node maximum-performance, which is currently employed, from the number of times of comparison and the number of valid cases retained in the number of comparisons and valid cases memory section 422, and gives the reliability degree of the node maximum-performance, which is currently employed, to the output section 114 (step S38 of FIG. 8). A reliability degree D is a value obtained by translating a ratio of the number of valid cases to the number of times of comparison into a numerical value, for example, a value to be calculated by $$D=Nv/Na$$

Assuming that the number of times of comparison is Na, and the number of valid cases is Nv. Last, the output section 114 outputs the given reliability degree to the output device 13.

In such a manner, in this embodiment, when the kind or the trend of the requests has changed in the external system, and the maximum performance value calculated in the past has not suited for the current situation, this is detected to take the coping step such as the resetting of the maximum performance, thereby enabling the virtual utilization rate, which is more accurate, to be calculated because the reliability degree of the maximum performance value to which a reference is currently made can be calculated based upon the recent maximum performance value.

The specific example of this third embodiment of the present invention will be explained. In this embodiment, a comparison is made between the latest node maximum-performance filed in the node maximum-performance memory section 121 and yet just calculated, and the node maximum-performance that was calculated or inputted in the past and yet is currently employed for the calculation of the current virtual utilization rate.

Suppose that, with regard to the above-mentioned node group, the node maximum-performances, which are currently employed, are "$\beta 1 \cdot \mu = 420$", "$\beta 2 \cdot \mu = 290$", and "$\beta 3 \cdot \mu = 910$", respectively. At this time, the virtual maximum-performance of the node group becomes $$420+290+910=1620$$

Now, when it is calculated that the latest node maximum-performances are "$\alpha 1 \cdot \mu = 350$", "$\alpha 2 \cdot \mu = 300$", and "$\alpha 3 \cdot \mu = 800$" respectively, the latest virtual maximum performance becomes $$350+300+800=1450$$

The maximum performance comparison section 411 investigates whether $$1620 \cdot (1-0.1) \leq 1450 \leq 1620 \cdot (1+0.1)$$

holds on the assumption that the allowable error is 10%, and further increase the number of times of comparison by one (1).

In this case, the number of valid cases cannot be increased because $1458 \leq 1450$ does not hold, which is apparent from $$1620 \cdot (1-0.1)=1458$$

In such a manner, the calculation of the latest node maximum-performances and the comparison with the node maximum-performance, which is currently employed, are repeated in the node maximum-performance calculation section 3112 and the maximum performance comparison section 411.

Suppose that carrying out this-time calculation and comparison of the node maximum-performances leads to that the number of times of comparison becomes "382" and the number of valid cases becomes "295". At this time, the reliability degree calculation section 412 calculates that the reliability degree is $$295/382 \approx 0.772$$

that is, 77.2%, and gives it to the output section 114.

In a case where this calculation and comparison leads to that the calculated reliability degree becomes very low, it means that the node maximum performance, which is currently employed, does not suit for the current load pattern, so there needs the coping action such as an update of the node maximum performance.

As mentioned above, the performance of the application operating over the system, which is not one simply proportional to the CPU performance, depends strongly upon the characteristics of the architecture and application of the CPU or the computer, the method of utilizing them, etc. However, in the present invention, it is possible to grasp the more accurate use situation or load of the system because the performance and the utilization rate of the node group can be calculated for the computer system that is composed of a plurality of the nodes each having the different performance and architecture.

Further, in the present invention, it is possible to quickly determine whether the operation of the system has been made as a whole at the utilization rate that is within the allowable range because the allowable utilization rate of the node group can be calculated from the allowable utilization rate of each node.

Moreover, in the present invention, it is possible to prepare an operational report having the virtual utilization rate arranged along a time series by printing the time of having calculated the virtual utilization rate can be output together with the virtual utilization rate.

Additionally, in the present invention, assuming all nodes constituting the external system to be one node group makes it possible to calculate the virtual maximum-performance and the virtual utilization rate of the entirety of the system. Further, the node group companions are grouped as an upper-ranked group to use the virtual maximum-performance and the virtual utilization rate of each group, thereby also enabling the virtual maximum-performance and the virtual utilization rate of the upper-ranked group to be calculated.

Further, as apparent from the above-mentioned explanation, the foregoing terminal of the present invention not only can be composed of the hardware, but also can be realized with the computer program. In this case, a processor operating under the program filed in the program memory allows the similar faculty/operation to that of the foregoing embodiment to be realized.

The present invention can apply to the applications such as the performance management, the operational management, and the capacity planning for a parallel computer or a cluster system to be composed of a plurality of the computing nodes, and a distributed system.

In the present invention, the effect can be obtained that employment of the configuration and operation as mentioned above makes it possible to easily carry out the management of the system performance and the optimization of the number operating node for the computer system that is composed of a plurality of the computing nodes each having the different performance and architecture.

The entire disclosure of Japanese Patent Application JP-P2004-274308A filed on Sep. 22, 2004 including specification, claims, drawing and summary are incorporated herein by reference in the entirety.

What is claimed is:

1. A system utilization rate managing apparatus configured to calculate a system utilization rate of a node group composed of a plurality of computing nodes, said system utilization rate managing apparatus comprising:
a node maximum-performance setter configured to set a maximum performance of each of said plurality of said computing nodes;
a resource utilization rate acquirer configured to acquire a resource utilization rate of each of said plurality of said computing nodes; and
a virtual utilization rate calculator configured to calculate a virtual utilization rate of an entirety of said node group as a weighted mean of said maximum performance set for each of said plurality of said computing nodes in said node maximum-performance setter and said resource utilization rate acquired in said resource utilization rate acquirer for each of said plurality of said computing nodes, wherein the resource utilization rate is a rate of use of a CPU for each of said plurality of said computing nodes.

2. The system utilization rate managing apparatus according to claim 1, wherein said node maximum-performance setter comprises:
a request arrival-rate acquirer configured to acquire a request arrival rate of each of said plurality of said computing nodes;
a node maximum-performance calculator configured to calculate a maximum performance of each of said plurality of said computing nodes from said resource utilization rate acquired in said resource utilization rate acquirer for each of said plurality of said computing nodes and said request arrival rate acquired in said request arrival-rate acquirer for each of said plurality of said computing nodes and to retain the maximum performance of each of said plurality of said computing nodes.

3. The system utilization rate managing apparatus according to claim 1, comprising a service satisfaction degree evaluator configured to evaluate whether said virtual utilization rate calculated in said virtual utilization rate calculator satisfies a specified service level.

4. The system utilization rate managing apparatus according to claim 1, comprising:
a maximum performance comparator configured to compare a maximum performance set in said node maximum-performance setter for a computing node with a maximum performance to be retained for the computing node, which is currently employed; and
a reliability degree calculator configured to calculate a reliability degree from a number of times that a comparison was made in said maximum performance comparator and a number of times that a difference between said maximum performance set in said node maximum-performance setter for the computing node and a maximum performance to be retained for the computing node, which was employed, was within an allowable range.

5. The system utilization rate managing apparatus according to claim 1, comprising a means configured to display said calculated virtual utilization rate along a time series.

6. A system utilization rate managing method to be employed in a system utilization rate managing apparatus configured to calculate a system utilization rate of a node group composed of a plurality of computing nodes, said system utilization rate managing method comprising the steps of:
setting a maximum performance of each of said plurality of said computing nodes;
acquiring a resource utilization rate of each of said plurality of said computing nodes; and
calculating, by the system utilization rate managing apparatus, a virtual utilization rate of an entirety of said node group as a weighted mean of said set maximum performance for each of said plurality of said computing nodes and said acquired resource utilization rate for each of said plurality of said computing nodes, wherein the resource utilization rate is a rate of use of a CPU for each of said plurality of said computing nodes.

7. The system utilization rate managing method according to claim 6, wherein, said step of setting a maximum performance comprises the steps of:
acquiring a resource utilization rate of each of said plurality of said computing nodes;
acquiring a request arrival rate of each of said plurality of said computing nodes; and
calculating a maximum performance of each of said plurality of said computing nodes from said acquired resource utilization rate for each of said plurality of said computing nodes and said acquired request arrival rate for each of said plurality of said computing nodes to retain the maximum performance of each of said plurality of said computing nodes.

8. The system utilization rate managing method according to claim 6, comprising a step of evaluating whether said virtual utilization rate satisfies a specified service level.

9. The system utilization rate managing method according to claim 6, further comprising the steps of:
comparing a maximum performance set for a computing node with a maximum performance to be retained for the computing node, which is currently employed; and
calculating a reliability degree from a number of times that a comparison was made and a number of times that a difference between said maximum performance set for the computing node and a maximum performance to be retained for the computing node, which was employed, was within an allowable range.

10. The system utilization rate managing method according to claim 6, wherein said system utilization rate managing apparatus displays said calculated virtual utilization rate along a time series.

11. A non-transitory computer-readable medium comprising instructions for causing a processor in a system utilization rate managing apparatus to execute a method for managing a system utilization rate of a node group composed of a plurality of computing nodes, comprising the steps of: setting a maximum performance of each of the plurality of the computing nodes; acquiring a resource utilization rate of each of the plurality of the computing nodes; and calculating a virtual utilization rate of an entirety of the node group as a weighted mean of the set maximum performance for each of the plurality of the computing nodes and the acquired resource utilization rate for each of the plurality of the computing nodes, wherein the resource utilization rate is a rate of use of a CPU for each of the plurality of the computing nodes.

12. The non-transitory computer-readable medium of claim 11, wherein the step of setting a maximum performance comprises: acquiring a resource utilization rate of each of the plurality of the computing nodes; acquiring a request arrival rate of each of the plurality of the computing nodes; and calculating a maximum performance of each of the plurality of the computing nodes from the acquired resource utilization rate for each of the plurality of the computing nodes and the acquired request arrival rate for each of the plurality of the computing nodes to retain the maximum performance of each of the plurality of the computing nodes.

13. The non-transitory computer-readable medium of claim 11, wherein the method for managing a system utilization rate further comprises the step of evaluating whether the virtual utilization rate satisfies a specified service level.

14. The non-transitory computer-readable medium of claim 11, wherein the method of managing a system utilization rate further comprises the steps of comparing a maximum performance set for a computing node with a maximum performance to be retained for the computing node, which is currently employed; and calculating a reliability degree from a number of times that a comparison was made and a number of times that a difference between the maximum performance set for the computing node and a maximum performance to be retained for the computing node, which was employed, was within an allowable range.

15. The non-transitory computer-readable medium of claim 11, wherein the method further comprises the step of displaying the calculated virtual utilization rate along a time series.

16. A system utilization rate managing apparatus configured to calculate a system utilization rate of a node group composed of a plurality of computing nodes, said system utilization rate managing apparatus comprising:
means for setting a maximum performance of each of said plurality of said computing nodes;
means for acquiring a resource utilization rate of each of said plurality of said computing nodes; and
means for calculating a virtual utilization rate of an entirety of said node group as a weighted mean of said set maximum performance for each of said plurality of said computing nodes and said acquired resource utilization rate for each of said plurality of said computing nodes, wherein the resource utilization rate is a rate of use of a CPU for each of said plurality of said computing nodes.

17. The system utilization rate managing apparatus of claim 16, wherein said means for setting a maximum performance of each of said plurality of said computing nodes comprises:
means for acquiring a request arrival rate of each of said plurality of said computing nodes; and
means for calculating a maximum performance of each of said plurality of said computing nodes from said acquired resource utilization rate for each of said plurality of said computing nodes and said acquired request arrival rate for each of said plurality of said computing nodes to retain the maximum performance of each of said plurality of said computing nodes.

18. The system utilization rate managing apparatus of claim 16, further comprising:
means for comparing a maximum performance set for a computing node with a maximum performance to be retained for the computing node, which is currently employed; and
means for calculating a reliability degree from a number of times that a comparison was made and a number of times that a difference between said maximum performance set for the computing node and a maximum performance to be retained for the computing node, which was employed, was within an allowable, range.

19. The system utilization rate managing apparatus of claim 16, further comprising means for displaying said calculated virtual utilization rate along a time series.

* * * * *